United States Patent
Sampigethaya (12)

(10) Patent No.: US 9,203,859 B2
(45) Date of Patent: Dec. 1, 2015

(54) METHODS AND SYSTEMS FOR CYBER-PHYSICAL SECURITY MODELING, SIMULATION AND ARCHITECTURE FOR THE SMART GRID

(75) Inventor: Radhakrishna G. Sampigethaya, Snoqualmie, WA (US)

(73) Assignee: The Boeing Company, Chicago, IL (US)

(*) Notice: Subject to any disclaimer, the term of this patent is extended or adjusted under 35 U.S.C. 154(b) by 45 days.

(21) Appl. No.: 13/363,726

(22) Filed: Feb. 1, 2012

(65) Prior Publication Data

US 2013/0198847 A1 Aug. 1, 2013

(51) Int. Cl.
*G06F 11/00* (2006.01)
*H04L 29/06* (2006.01)

(52) U.S. Cl.
CPC ............. *H04L 63/1433* (2013.01); *H04L 63/14* (2013.01); *Y04S 40/24* (2013.01)

(58) Field of Classification Search
None
See application file for complete search history.

(56) References Cited

U.S. PATENT DOCUMENTS

| | | | | |
|---|---|---|---|---|
| 2004/0199793 | A1* | 10/2004 | Wilken et al. | 713/201 |
| 2011/0193677 | A1* | 8/2011 | Ho et al. | 340/3.1 |
| 2011/0208849 | A1* | 8/2011 | Barnett et al. | 709/223 |
| 2011/0257956 | A1* | 10/2011 | Goel et al. | 703/18 |

FOREIGN PATENT DOCUMENTS

WO 2011155961 A2 12/2011

OTHER PUBLICATIONS

Study of Security Attributes of Smart Grid Systems—Current Cyber Security Issues; U.S. Dept. of Energy Office of Electricity Delivery and Energy Reliability; Apr. 2009; 39 pages.

Feroze, H.; Multi-Agent Systems in Microgrids: Design and Implementation; Submitted to the Faculty of the Virginia Polytechnic Institute and State University; Aug. 7, 2009; 143 pages.

Yang et al., Impact of Cyber-Security Issues on Smart Grid, Innovative Smart Grid Technologies, dated Dec. 5, 2011, pp. 1-7.

Chee-Wooi Ten et al., Cybersecurity for Critical Infrastructures: Attack and Defense Modeling, IEEE Transactions on Systems, Man, and Cybernetics—Part A Systems and Humans, dated Jul. 1, 2010, pp. 853-865 vol. 40, No. 4.

Queiroz et al., SCADASim—A Framework for Building SCADA Simulations, IEEE Transactions on Smart Grid, dated Dec. 1, 2011, pp. 589-597, vol. 2, No. 4.

Premaratne et al., An Intrusion Detection System for IEC61850 Automated Substations, IEEE Transactions on Power Delivery, dated Oct. 4, 2010, pp. 2376-2383, vol. 25, No. 4.

International Search Report, Application No. PCT/US2013/020170, dated Apr. 18, 2013, pp. 13.

International Preliminary Report on Patentability and Written Opinion of International Application No. PCT/US2013/020170; Aug. 5, 2014; 8 pages.

* cited by examiner

*Primary Examiner* — David Le
*Assistant Examiner* — Devin Almeida
(74) *Attorney, Agent, or Firm* — Armstrong Teasdale LLP

(57) ABSTRACT

A computer-implemented method for use in evaluating at least one threat to a complex system includes identifying one or more physical components of the complex system and modeling the one or more physical components with interactive software multi-agents. The multi-agents are programmed to monitor and control at least one function of the modeled physical components. One or more threats to a target of the complex system are identified. Each threat is defined as a cyber threat or physical threat and the target is defined as a cyber component or physical component. The method includes simulating an attack on the complex system by the identified threat and assessing an impact of the attack on the complex system.

20 Claims, 5 Drawing Sheets

| Threat | Vulnerability exploited is in? | Target of the attack is in? | Examples of the threat |
|---|---|---|---|
| Threat 1 | P | P | Destruction or damage to the electrical grid, such as generator, transformer, transmission line |
| Threat 2 | P | C | Physical compromise of the smart grid node (e.g., network node tampering) or communication (e.g., RF jamming); misuse P property for energy user privacy breach; false alarm of P event |
| Threat 3 | C | P | Cyber attacks that create physical disruptions (e.g., blackout, overload) in the electrical grid |
| Threat 4 | C | C | Traditional Internet and "cyber" attacks in the smart grid that lead to data, computer, network disruptions (e.g., utilities database compromise, intrusion or malware in computer) |

FIG. 4

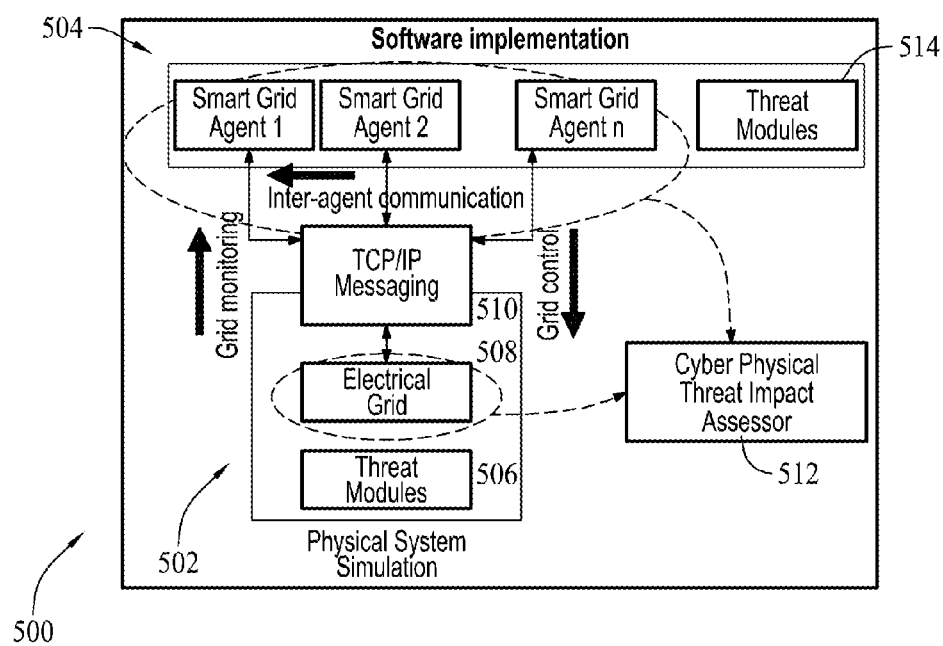

FIG. 5

METHODS AND SYSTEMS FOR CYBER-PHYSICAL SECURITY MODELING, SIMULATION AND ARCHITECTURE FOR THE SMART GRID

BACKGROUND

The field of the disclosure relates generally to complex-system security, and more particularly, to methods and systems for cyber-physical security modeling, simulation and architecture for complex systems, such as smart grids.

The United States typically requires over 475 GWh of electricity per hour. That minimum demand level is expected to increase by at least about 30% before year 2030. However, most of the existing electrical grid infrastructures are either close to their end of their useful life and/or dependent upon depleting non-renewable energy resources. Further, electricity generation generates several million tonnes of carbon dioxide ($CO_2$) emissions, which may over time expand the environmental footprint and potentially accelerates climate change. Electricity rates are also forecasted to increase by at least about 50% before year 2015. Stakeholders in this aging grid include utilities, technology providers, regulators, policy makers, environmental groups, and consumers.

Typically a smart grid is used to securely ensure that operation of the modernized electrical grid is safe, deterministic, and predictable, under both normal and abnormal conditions. However, there is lack of understanding of how emerging vulnerabilities due to the tight integration between "cyber" components (defined as an intangible mix of computing, software, and networking) and physical components in the smart grid can impact system safety, consumer privacy and stakeholder business. A need exists to assess security of potential vulnerabilities, and privacy concerns against smart meters and smart home devices. Security solutions traditionally applied to the cyber domain are not enough due to, at least, the smart grid being a unique large-scale "cyber-physical" system. Therefore, a need exists to establish a foundational understanding and assessment of threats and develop effective mitigation solutions for the smart grid.

BRIEF DESCRIPTION

In one aspect, a computer-implemented method for use in evaluating at least one threat to a complex system includes identifying one or more physical components of the complex system and modeling the one or more physical components with interactive software multi-agents. The multi-agents are programmed to monitor and control at least one function of the modeled physical components. One or more threats to a target of the complex system are identified. Each threat is defined as a cyber attack or physical attack on a target, which is defined as a cyber component or physical component. The method includes simulating an attack on the complex system by the identified threat and assessing an impact of the attack on the complex system.

In another aspect, a non-transitory computer-readable medium storing program includes instructions for use in evaluating at least one threat for a complex system. The instructions cause the processor to identify one or more physical components of the complex system and model the one or more physical components with interactive software multi-agents, the multi-agents programmed to monitor and control at least one function of the modeled physical components. The instructions include commands to identify one or more threats to a target of the complex system; wherein the threat is defined as a cyber attack or physical attack on a target which is defined as a cyber component or physical component, simulate an attack on the complex system by the identified threat, and assess an impact of the attack on the complex system.

In yet another aspect, a computer system is in communication with a smart-grid. The computer system includes a processor programmed to identify one or more physical components of the complex system and model the one or more physical components with interactive software multi-agents, the multi-agents programmed to monitor and control at least one function of the modeled physical components. The processor is also programmed to identify one or more threats to a target of the complex system; wherein the threat is defined as a cyber attack or physical attack on a target which is defined as a cyber component or physical component, simulate an attack on the complex system by the identified threat, and assess an impact of the attack on the complex system.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 4 is a chart illustrating a cyber-physical threat model for use with the smart grid of FIG. 1.

FIG. 5 is a block diagram of a cyber-physical security simulation for use in measuring and assessing a cyber attack on the smart grid of FIG. 1.

DETAILED DESCRIPTION

Figure 1:
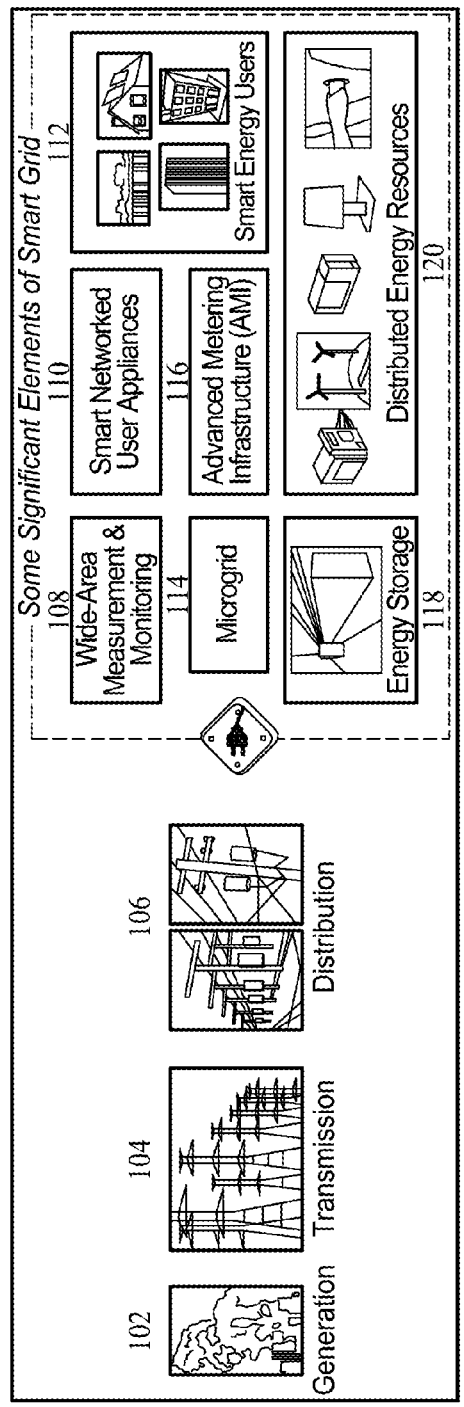
FIG. 1 is a block diagram of an exemplary smart grid.

Shown generally in FIG. 1 is an exemplary smart grid 100. Elements of smart grid 100 include power generation component 102, power transmission component 104, and power distribution component 106. In some embodiments, smart grid 100 includes one or more of a wide-area measuring and monitoring component 108, smart networked user appliances 110, smart energy users 112, a microgrid 114, advanced metering infrastructure (AMI) 116, an energy storage component 118, and distributed energy resources (DER) 120. In one embodiment, DER 120 includes one or more microturbines, combustion turbines, reciprocating engines, sterling engines, fuel cells, photovoltaic systems, wind systems, hybrid systems, combined heat and power (CHP) and the like. In some embodiments, energy storage components 118 include one or more batteries, flywheels, supercapacitors, superconducting magnetic storage and compressed air storage. In another embodiment, microgrid 114 is a system connecting two or more DER systems and interconnected loads that can operate in parallel (i.e., on a feeder line connected to the main grid) or in isolation from the main grid (i.e., island mode) to serve as an enhancement or alternative. In one embodiment, microgrid 114 spans a local region.

In one embodiment, AMI 116 is a component of smart grid 100 that connects utilities with homes and buildings. For example AMI 116 may be an intelligent sensor network in smart grid 100 that records and reports the continuous state (e.g., energy demand) and power grid events (e.g., outages) as well as control power flow to consumers (e.g., remote "off" switch). In some embodiments, AMI 116 is composed of a fabric of networked smart meters, each connected to a home or building, and possesses the necessary hardware and software for computing, communications and control. In other embodiments, AMI 116 can be accessed by the utilities management system, consumer and other connected, authorized information systems in the electrical grid. In yet other embodiments, AMI 116 is configured to enable beneficial services in smart grid 100, such as dynamic pricing, Automatic Meter Reading (AMR) and quality power management.

Figure 2:
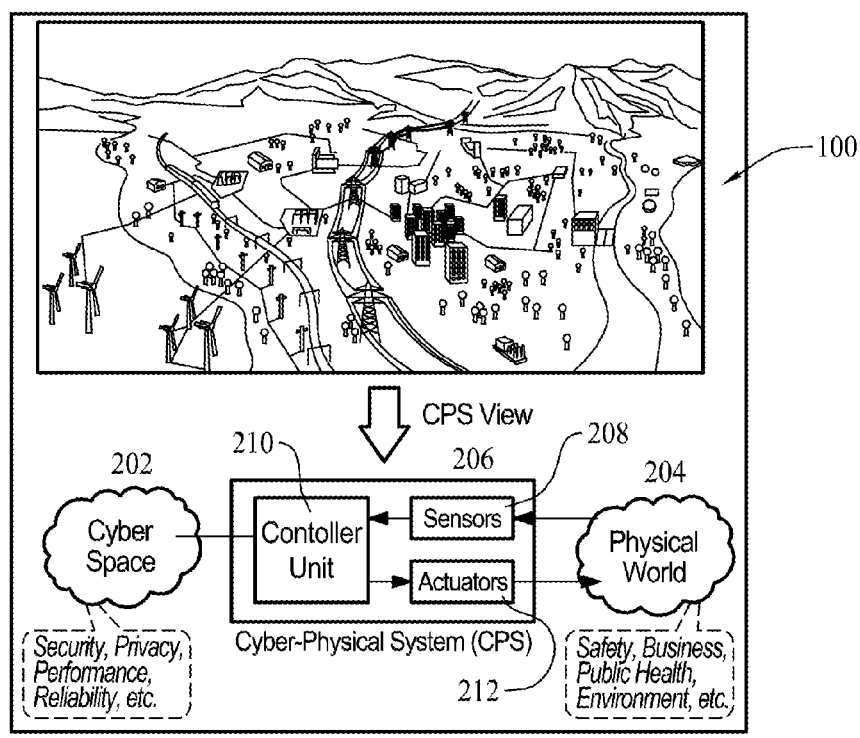
FIG. 2 is a block diagram of a cyber-physical view of the smart grid of FIG. 1.

FIG. 2 shows a high-level cyber-physical system view of smart grid 100. As shown in FIG. 2, smart grid 110 includes a cyberspace element 202, a physical-world element 204 and a cyber-physical system (CPS) 206. In one embodiment, cyberspace element 202 relates to one or more of security, privacy, performance, reliability and the like of smart grid 100. Physical-world element 204 relates to one or more of safety, businesses, public health, the environment and the like. CPS 206 integrates cyberspace elements with the physical world elements and enables control and coordination between them. In one embodiment, CPS 206 has one or more of sensors 208, a controller unit 210, and actuators 212 embedded and networked into the physical infrastructure of smart grid 100, connected to the cyberspace of smart grid 100, and may be referred to as foundational elements of smart grid 100.

Figure 3:
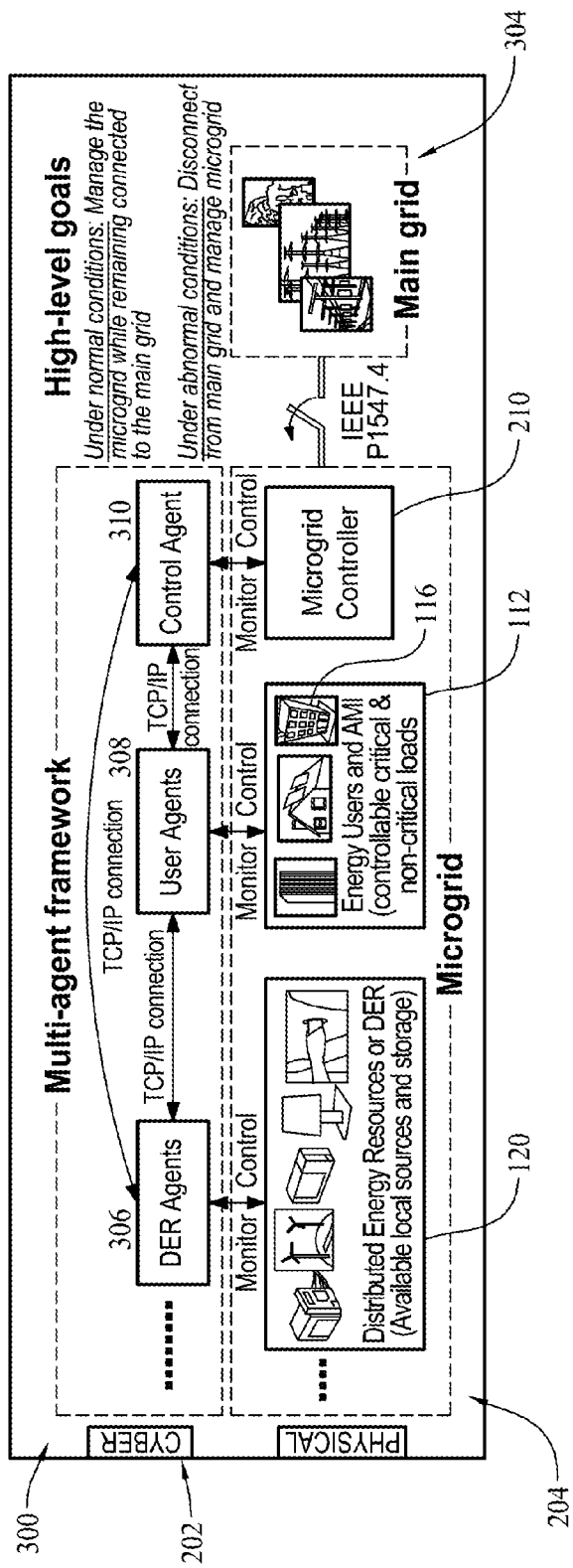
FIG. 3 is a block diagram of an exemplary multi-agent system component of the smart grid of FIG. 1.

Shown in FIG. 3 is a block diagram of an exemplary multi-agent system (MAS) 300 including cyberspace component 202 and physical component 204. MAS 300 is a system that includes two or more intelligent software agents, each capable of targeting an independent goal and communicating with each other. In some embodiments, MAS 300 is an autonomous, flexible technology that performs monitoring, diagnosis and distributed control of physical components and properties of smart grid 100. In other embodiments, MAS 300 provides fault tolerance and self-coordination in the electrical grid. In one embodiment, MAS 300 is connected to a main power grid 304 that may include one or more of power generation 102, power transmission 104, and power distribution 106 components. In one embodiment, MAS 300 monitors and controls the behavior of the physical infrastructure and environment of smart grid 100. For example, MAS 300 may be configured to control and coordinate one or more of power generation 102, power transmission 104, and power distribution 106 components to enable time varying consumer power demands be met seamlessly, and to manage interruptions or variations in power supply safely, gracefully and fairly.

In one embodiment, physical component 204 includes a microgrid 114 connected to main grid 304 under IEEE P1547.4 standard. In another embodiment, microgrid 114 operates in an island mode upon detection of a failure, disruption or high energy cost in main grid 304. In some embodiments, cyber-world component 202 includes one or more of a distributed energy resource (DER) agent 306, a user agent 308, and a control agent 310. DER agent 306 stores power supply information such as identification, type, power rating, energy price, energy capacity and availability of DER 120. User agent 308 provides a user with real-time information of elements of the microgrid 114, monitor power consumption of critical and non critical loads of energy users 112 and AMI 116 and controls a status of loads of energy users 112 based on predefined user-settings/priorities. Control agent 310 monitors system voltage, frequency, detects grid failures, actuates circuit breakers to isolate microgrid 210 and receives energy price data from main grid 304 prior to publishing the energy prices in microgrid 210.

FIG. 4 is a chart showing an exemplary cyber-physical threat model 400 for use in smart grid 100. Within smart grid 100, one or more cyber (C) or physical (P) attacks may exploit vulnerabilities in cyber component 202 or physical component 204. Each threat C or P may be independent of every other threat. In the exemplary embodiment, threat model 400 includes Threat 1. Threat 1 is a physical attack that exploits a vulnerability in physical components 204 of smart grid 100. Impacts of Threat 1 on smart grid 100 are similar to the disruptions from natural causes, such as natural disasters, severe weather, or unintentional human errors. However, in the exemplary embodiment, in Threat 1 the cause is due to the physical effort expended by an adversary to smart grid 100. Disruptions due to Threat 1 include, for example, destruction or damage to physical components of smart grid 100, such as the electrical grid, generators, transformers, transmissions lines and the like.

Threat 2 represents a physical attack on cyber component 202. For example, a radio frequency jamming attack, where noise is transmitted to degrade signal-to-noise ratios at a receiver and to block a wireless communication from reaching an agent in smart grid 100. Another example of a physical attack on cyber component 202 is a node capture attack, wherein the adversary physically compromises a physical device and accesses all information in the device including any cryptographic keys or data. In another example, physical properties of power devices in physical component 204 may be leveraged to derive energy usage patterns and personal preferences/lifestyles of consumers from high-granularity data in cyber component 202. In yet a further example, dynamics of the physical process of physical component 204 are manipulated to generate false alarms in cyber components 202. For example, in such embodiment, physical component 204 may be momentarily manipulated to change a temperature to bias thermal readings at a smart grid sensor.

In the exemplary embodiment, Threat 3 represents a cyber attack on physical component 204. For example, a cyber attack creates an unexpected failure mode in physical component 204 that may be difficult to predict or mitigate, and thus requires the design of suitable response and recovery schemes and procedures for smart grid 100. In another example, attacks in CPS 210 may be the same as some in cyber components 202, but the attack impact varies based on physical components 204 (e.g., a spoofing attack may have bigger consequences in physical components 204, than in cyber components 202, and thus the impact depends on the amount/level that the physical components 204 constitute or support the electrical grid).

In the exemplary embodiment, Threat 4 represents a cyber attack on cyber components 202. The attacks considered under Threat 4 may threaten cyber components 202, for example, in terms of the integrity, confidentiality and availability of energy management systems data such as consumer energy usage history and up-to-date billing information (e.g., utilities database compromise by an intrusion or malware in a smart grid computer).

In one embodiment cyber attacks (C) are omnipresent, but in physical components 204 the adversary's location and movement are physically constrained. In other embodiments, an adversary C is computationally bounded and a cost is associated with the P adversary. As used herein, the terms "threats" and "adversary" encompass actors aimed to cause catastrophic events or at least degrade performance of smart grid 100 by attacking networking and information technology of smart grid 100. Examples of threats or adversaries include, for example, hackers, criminal organizations, or terrorists interested in impacting national security, economy, or public well being. For example, in one embodiment, adversaries are external to smart grid 100 and capable of passive eavesdropping of communications as well as active attacks on nodes and communications (e.g., intrusion, node compromise, data corruption, spoofing, and signal jamming). In another embodiment, adversaries may be capable of simultaneously attacking smart grid 100 at multiple points. Other examples include, the adversary being an insider (e.g., disgruntled employee) that compromises some nodes in smart grid 100.

FIG. 5 shows a block diagram of an exemplary cyber-physical security simulation 500 for measuring and assessing a cyber attack on smart grid 100. In one embodiment, simulation 500 includes a physical system simulation 502 and software agents 504. In the exemplary embodiment, physical system simulation 502 includes one or more of threat modules 506, electrical grid module 508 and TCP/IP messaging module 510. In such embodiment, threat modules 506 enable conducting physical attacks on the electrical grid components. In another embodiment, threat modules 514 enable conducting cyber attacks on software agents 504 to evaluate software agent resilience and robustness. A threat impact assessor module 512 receives data from physical system simulator 502 and software agents 504 and evaluates impacts of successful simulated attacks on the electric grid 508 monitored and controlled by the software agents 504.

Figure 6:
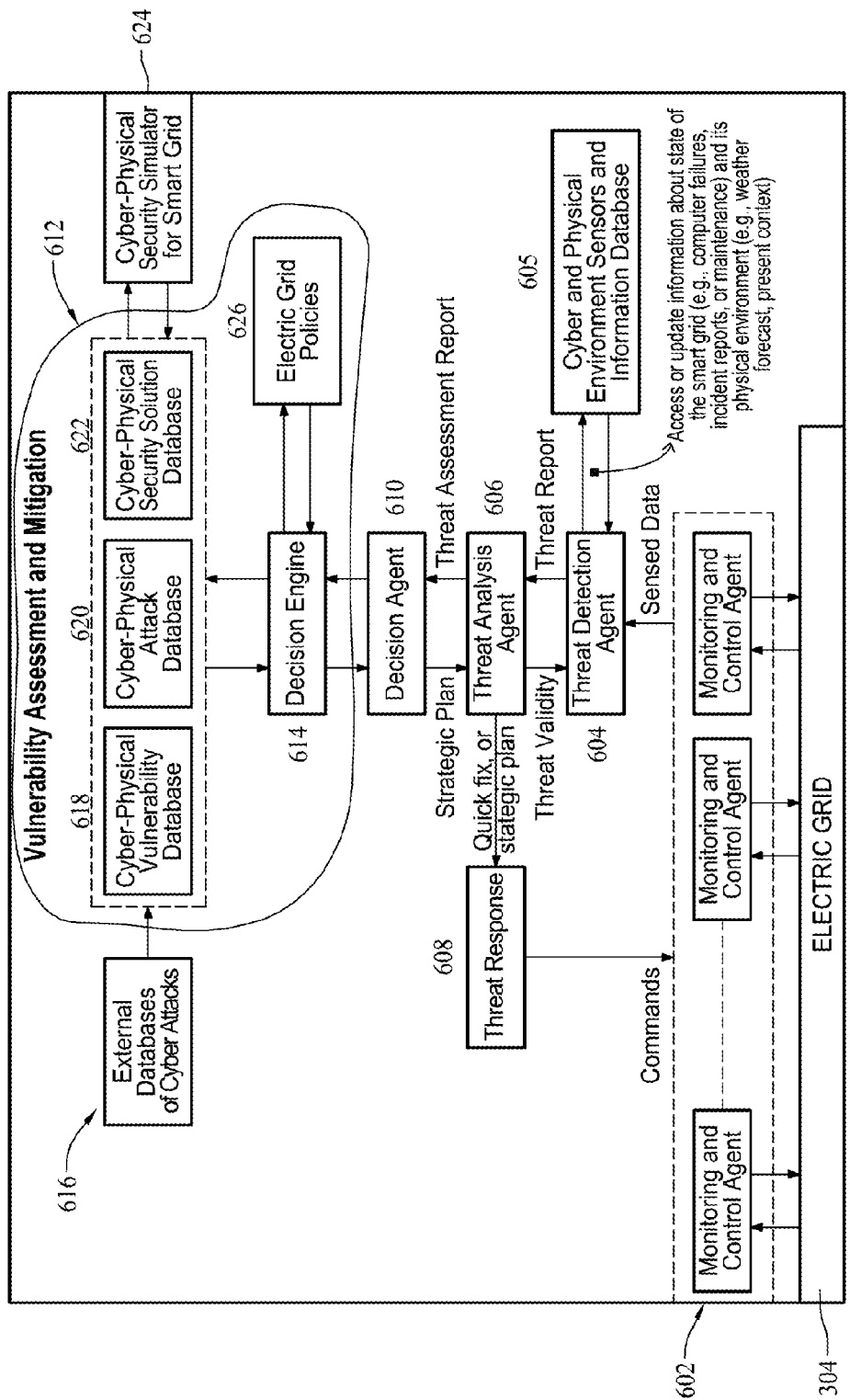
FIG. 6 is a block diagram of an exemplary system that may be used to detect, mitigate, prevent, respond to or recover from attacks on the smart grid of FIG. 1.

FIG. 6 shows a block diagram of MAS 300 architecture that may be used to detect, mitigate, prevent, respond to or recover from attacks classified in threat model 400. In one embodiment, Threat 4 (i.e., cyber attacks targeted on cyber components 202) are limited only to monitoring and control agents 602 and their TCP/IP communications, and not to any of the other agents. In another embodiment, other monitoring and control agents 602 are assumed to be hosted on a physically secure centralized information system connected to the electric grid 304 (e.g., hosted in a computer server at a monitored generation, transmission, or distribution facility or substation in the electrical grid). In such embodiment, monitoring and control agents 602 may be any agent associated with a device of electric grid 304. For example, at least one of monitoring and control agents 602 are DER agent 306, user agent 308 or control agent 310 shown in FIG. 3. In other embodiments, monitoring and control agents 602 includes an agent that resides on a field device in the transmission, distribution or consumption part of the electrical grid 304. Monitoring and control agents 602 measure and control a physical resource of the electric grid 304, such as physical components 204. Due to the ease of unauthorized access to the large-scale electric grid, the devices containing agent 602 can be compromised and the agent itself can be compromised or the agent's communications can be manipulated. Monitoring and control agents 602 may be configured to interact with each other to verify the presence of any abnormality in electric grid 304.

In one embodiment, abnormal readings or behavior detected by one or more monitoring and control agent 602 is reported to threat detection agent 604. Threat detection agent 604 has access to an information database 605 including data such a latest wind or weather forecast for the environment of electric grid 304, cyber security events in smart grid 100, etc. Threat detection agent 604 is configured to determine if a monitoring and control agent 602 is generating a false data (which means the monitoring and control agent 602 is likely compromised or faulty) or if the sensed threat condition is valid, for example a threat condition may be defined as a potential exploit of a vulnerability. If the sensed threat condition is valid, then a threat report is sent to the threat analysis agent 606. In one embodiment, threat analysis agent 606 is configured to evaluate threat severity based on the received threat report, verify the threat report is correct and make a decision about responding to threat. A quick-fix decision is needed is some cases, for example, where the threat is considered likely to cascade and create a large impact on electric grid 304. In such situation, the quick-fix decision is sent to a threat response agent 608. In other embodiments, a threat assessment report is sent by threat analysis agent 606 to a decision agent 610. Decision agent 610 has access to a vulnerability assessment and mitigation engine 612, that can determine a strategic response for the detected threat. The mitigation engine 612 includes databases 616 containing cyber and cyber-physical attack signatures 618, vulnerability reports 620 and security fixes 622. The mitigation engine 612 may further include, or have access to, a cyber-physical security simulator 624 that evaluates the impact of a threat condition and effectiveness of a threat response. In one embodiment the decision agent may use policies 626 of electric grid 304 to ensure that the threat response does not violate rules and regulations that govern the electric grid operations, as well as balances business/consumer interests.

In one embodiment, technical effects of the methods, systems, and computer-readable media described herein include at least one of: (a) modeling the one or more physical components with interactive software multi-agents, the multi-agents programmed to monitor and control at least one function of the modeled physical components, (b) identifying one or more threats to a target of the complex system; wherein the threat is defined as a cyber attack or physical attack on a target which is defined as a cyber component or physical component, (c) simulating an attack on the complex system by the identified threat and (d) assessing an impact of the attack on the complex system.

In some embodiments, the above-described systems and methods are electronically or computer implemented. The embodiments described herein are not limited to any particular system controller or processor for performing the processing and tasks described herein. The term controller or processor, as used herein, is intended to denote any machine capable of performing the calculations, or computations, necessary to perform the tasks described herein. The terms controller and processor also are intended to denote any machine that is capable of accepting a structured input and of processing the input in accordance with prescribed rules to produce an output. It should also be noted that the phrase "configured to" as used herein means that the controller/processor is equipped with a combination of hardware and software for performing the tasks of embodiments of the invention, as will be understood by those skilled in the art. The term controller/processor, as used herein, refers to central processing units, microprocessors, microcontrollers, reduced instruction set circuits (RISC), application specific integrated circuits (ASIC), logic circuits, and any other circuit or processor capable of executing the functions described herein.

The embodiments described herein embrace one or more computer readable media, including non-transitory computer readable storage media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Aspects of the disclosure transform a general-purpose computer into a special-purpose computing device when configured to execute the instructions described herein. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

A computer or computing device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for use in evaluating at least one threat to a complex system, said method comprising:
    identifying one or more physical components of the complex system, wherein the one or more physical components include a microgrid that is coupled to a main grid;
    modeling the one or more physical components with interactive software multi-agents, wherein the multi-agents are programmed to monitor and control at least one function of the modeled physical components;
    identifying, using a threat model that identifies a cyber vulnerability associated with the one or more physical components, at least one threat to a targeted physical component of the one or more physical components of the complex system;
    generating a threat report based on the at least one identified threat;
    evaluating a threat severity based on the generated threat report;
    assessing an impact of the at least one threat on the complex system; and
    decoupling the microgrid from the main grid to operate the microgrid in an island mode in response to assessing the impact of the at least one threat.

2. The method according to claim 1, wherein said modeling comprises modeling the multi-agents as at least one of a monitoring and control agent, a threat detection agent, a threat analysis agent, a threat response agent and a decision agent.

3. The method according to claim 1, wherein evaluating a threat severity comprises evaluating a threat severity of a cyber attack to the one or more physical components.

4. The method according to claim 1, wherein said assessing comprises assessing an impact of a smart grid.

5. The method according to claim 1, wherein said identifying comprises identifying the physical components of the system as at least one of a distributed energy resource and an energy storage system.

6. The method according to claim 1, further comprising:
    accessing data comprising information about a state of the complex system and a physical environment of the complex system.

7. The method according to claim 1, further comprising:
    simulating the threat response to determine an effectiveness of the threat response.

8. The method according to claim 1, further comprising:
    evaluating a severity of the at least one identified threat, verifying the at least one identified threat has been correctly identified and providing a threat assessment report including the threat severity to a decision agent, wherein the decision agent accesses a vulnerability and mitigation engine that determines the threat response for the at least one identified threat using a multi-agent system based architecture.

9. A non-transitory computer-readable medium storing program instructions for use in evaluating at least one cyber and physical threat for a complex system, the program instructions causing a processor to:
    identify one or more physical components of the complex system, wherein the one or more physical components include a microgrid that is coupled to a main grid;
    model the one or more physical components with interactive software multi-agents, the multi-agents programmed to monitor and control at least one function of the modeled physical components;
    identify, using a threat model that identifies a cyber vulnerability associated with the one or more physical components, at least one threat to a targeted physical component of the one or more physical components of the complex system;
    generate a threat report based on the at least one identified threat;
    evaluate a threat severity based on the generated threat report;
    assess an impact of the at least one threat on the complex system; and
    decouple the microgrid from the main grid to operate the microgrid in an island mode in response to assessing the impact of the at least one threat.

10. The computer-readable medium according to claim 9, wherein the multi-agents comprise at least one monitoring and control agent, a threat detection agent, a threat analysis agent, a threat response agent and a decision agent.

11. The computer-readable medium according to claim 9, wherein evaluating a threat severity comprises evaluating a threat severity of a cyber attack to the one or more physical components.

12. The computer-readable medium according to claim 9, wherein the complex system comprises a smart grid.

13. The computer-readable medium according to claim 9, wherein the physical components of the system comprise at least one of a distributed energy resource and an energy storage system.

14. The computer-readable medium according to claim 9, further comprising instructions for:
   accessing data comprising information about a state of the complex system and a physical environment of the complex system.

15. The computer-readable medium according to claim 9, further comprising instructions for:
   simulating the threat response to determine an effectiveness of the threat response.

16. The computer-readable medium according to claim 9, further comprising instructions for:
   evaluating a severity of the at least one identified threat, verifying the at least one identified threat has been correctly identified and providing a threat assessment report including the threat severity to a decision agent, wherein the decision agent accesses a vulnerability and mitigation engine that determines the threat response for the at least one identified threat.

17. A computer system in communication with a smart-grid, the computer system comprising:
   a multi-agent system that:
      identifies one or more physical components of the complex system, wherein the one or more physical components include a microgrid that is coupled to a main grid;
      models the one or more physical components with interactive software multi-agents, the multi-agents programmed to monitor and control at least one function of the modeled physical components;
      identifies, using a threat model that identifies a cyber vulnerability associated with the one or more physical components, at least one threat to a targeted physical component of the one or more physical components of the complex system;
      generates a threat report based on the at least one identified threat;
      evaluates a threat severity based on the generated threat report;
      assesses an impact of the at least one threat on the complex system; and
      decouples the microgrid from the main grid to operate the microgrid in an island mode in response to assessing the impact of the at least one threat.

18. The system according to claim 17, wherein the multi-agents comprise at least one monitoring and control agent, a threat detection agent, a threat analysis agent, a threat response agent and a decision agent.

19. The system according to claim 17, wherein evaluating a threat severity comprises evaluating a threat severity of a cyber attack to the one or more physical components.

20. The system according to claim 17, wherein the complex system comprises a smart grid.

* * * * *